(12) United States Patent
Hand et al.

(10) Patent No.: US 8,031,704 B2
(45) Date of Patent: Oct. 4, 2011

(54) NETWORK PLANNING AND OPTIMIZATION OF EQUIPMENT DEPLOYMENT

(75) Inventors: Steven Joseph Hand, San Jose, CA (US); Jayaram Hanumanthappa, Bangalore (IN); Mohit Misra, Bangalore (IN); Maneesh Jain, Dehradun (IN); Rajasekar Venkatesan, Saratoga, CA (US); Atul Saxena, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 312 days.

(21) Appl. No.: 11/876,705

(22) Filed: Oct. 22, 2007

(65) Prior Publication Data

US 2009/0103453 A1   Apr. 23, 2009

(51) Int. Cl.
*H04L 12/50* (2006.01)
*H04Q 11/00* (2006.01)

(52) U.S. Cl. ......................................................... 370/359
(58) Field of Classification Search .......................... None
See application file for complete search history.

(56) References Cited

U.S. PATENT DOCUMENTS

| | | | |
|---|---|---|---|
| 6,412,100 B1* | 6/2002 | Sasagawa et al. | 716/9 |
| 6,636,478 B1* | 10/2003 | Sensel et al. | 370/216 |
| 6,901,072 B1* | 5/2005 | Wong | 370/389 |
| 7,005,938 B1* | 2/2006 | Baradaran | 333/17.3 |
| 7,046,626 B2* | 5/2006 | Davis et al. | 370/230 |
| 7,245,629 B1* | 7/2007 | Yip et al. | 370/438 |
| 7,433,953 B1* | 10/2008 | Kappler et al. | 709/226 |
| 2002/0089972 A1* | 7/2002 | Chang et al. | 370/352 |
| 2002/0173315 A1* | 11/2002 | Chmaytelli et al. | 455/453 |
| 2003/0056138 A1* | 3/2003 | Ren | 714/4 |
| 2003/0099247 A1* | 5/2003 | Toutant et al. | 370/401 |
| 2005/0096884 A1* | 5/2005 | Fishkin et al. | 703/1 |
| 2005/0180348 A1* | 8/2005 | Burdick et al. | 370/316 |
| 2007/0150254 A1* | 6/2007 | Choi et al. | 703/22 |
| 2007/0162720 A1* | 7/2007 | Branda et al. | 711/173 |
| 2008/0052436 A1* | 2/2008 | Sharma et al. | 710/301 |
| 2008/0155240 A1* | 6/2008 | Bagwell et al. | 713/1 |
| 2008/0306798 A1* | 12/2008 | Anke et al. | 705/8 |
| 2009/0075648 A1* | 3/2009 | Reed et al. | 455/424 |
| 2009/0100386 A1* | 4/2009 | Allen et al. | 716/2 |

* cited by examiner

*Primary Examiner* — Ayaz Sheikh
*Assistant Examiner* — Peter Chau
(74) *Attorney, Agent, or Firm* — Ross M. Carothers; North Weber & Baugh, LLP; W. Douglas Carothers

(57) ABSTRACT

Embodiments of the present invention provide systems, devices and methods for improving the efficient deployment and configuration of networking equipment within a network build-out. In certain embodiments of the invention, an iterative analysis of inter-node equipment placement and connectivity, and inter- and intra-node traffic flow is performed to identify a preferred deployment solution. This analysis of deployment optimization takes into account both configurations from a network node perspective as well as from a network system perspective. Deployment solutions are iteratively progressed and analyzed to determine a preferred solution based on both the cost of deployment and satisfaction of the network demands. In various embodiments of the invention, a baseline marker is generated from which the accuracy of the solution may be approximated that suggests to an engineer whether the deployment is approaching an optimal solution.

9 Claims, 14 Drawing Sheets

NETWORK PLANNING AND OPTIMIZATION OF EQUIPMENT DEPLOYMENT

BACKGROUND

A. Technical Field

The present invention relates generally to the deployment of equipment within a network, and more particularly, to an analysis of network equipment deployment relative to optimization factors including intra-nodal routing and post-processing heuristics.

B. Background of the Invention

The deployment of a cost-effective and fault tolerant network can often be a complex task. This deployment requires that the equipment cost and network performance should be properly balanced to find an appropriate solution for a network provider. As the number of nodes or sites within a network scales, the difficulty in finding this properly balanced solution becomes increasingly complex.

In building out a network, a network service provider may give an equipment manufacturer a number of different parameters and request that the manufacturer provide a cost estimate for the build-out. For example, the equipment manufacturer may be provided certain network demands including a topology of the network, a description of each of the relevant sites within the network, and the connectivity and bandwidth requirements between these sites. The equipment manufacturer is expected to processes these parameters and design a deployment that satisfies these parameters while maintaining use of equipment requirements by a network service provider.

Deployment solutions generated by different equipment manufacturers may significantly vary depending on the manner in which it was created and the factors that were considered. It is not uncommon to have different solutions that widely vary in the amount of equipment to be deployed as well as the configuration thereof. An equipment provider may lose a deployment bid if its deployment proposal is too expensive (i.e., the amount of equipment deployed is more than required to satisfy the network parameters) or the equipment configuration is not able to satisfy all of the demands.

One skilled in the art will recognize that oftentimes there is not a metric from which the accuracy of a proposed deployment may be approximated. In the case of a simple deployment, a network engineer may rely on past experience to judge the quality of a proposed deployment relative to the requirements of the network. However, as the size and/or complexity of the deployment increases, this off-the-cuff judgment oftentimes fails due to the sheer magnitude of analysis required to generate the proposal. An equipment provider may analyze a proposed deployment to ensure that the network parameters are met, but this proposed deployment is oftentimes not sufficiently analyzed to determine whether a more cost-effective deployment is available that still satisfies the network demands. Accordingly, an equipment manufacturer runs a risk of over-deploying equipment within a network solution to meet particular network parameters set forth by the network service provider.

Accordingly, what is desired are systems, devices and methods that address the above-described deficiencies within the prior-art network planning and equipment deployment solutions.

SUMMARY OF THE INVENTION

Embodiments of the present invention provide systems, devices and methods for improving the efficient deployment and configuration of networking equipment within a network build-out. In certain embodiments of the invention, an iterative analysis of inter-node equipment placement and connectivity, and inter- and intra-node traffic flow is performed to identify a preferred deployment solution. This analysis of deployment optimization takes into account both configurations from a network node perspective as well as from a network system perspective. Deployment solutions are iteratively progressed and analyzed to determine a preferred solution based on both the cost of deployment and satisfaction of the network demands. In various embodiments of the invention, a baseline marker is generated from which the accuracy of the solution may be approximated that suggests to an engineer whether the deployment is approaching an optimal solution.

Initial methods are performed that determine an initial number of line cards to be inserted within a chassis to support the required traffic demands of the corresponding node. A set of transport-side line cards are determined to ensure that sufficient bandwidth and connectivity is provided within a node to satisfy all transport-side demands of the deployment. A set of client-side line cards are determined to ensure that sufficient bandwidth and connectivity provided within a node to satisfy all client-side demands of the deployment. In various embodiments of the invention, the placement of these line cards may be determined to enhance the performance of the node or improve the degrees of freedom of the chassis to make a subsequent use or expansion of the chassis relatively easier.

Post-processing heuristics are applied to these sets of line cards in an attempt to reduce the amount of equipment, including line cards and chassis, deployed while still ensuring that the deployment demands are satisfied. In various embodiments of the invention, the fractional utilization on multiple line cards is analyzed to try and improve the capacity utilization of line cards within a chassis. If this line card capacity utilization is sufficiently improved, then a reduction in the amount of equipment required in the deployment of the network and greater degrees of freedom for future demands on the node may be realized.

In certain embodiments of the invention, reordering of nodal flows is performed to determine if there is a more efficient placement of line cards at a node with respect to chassis backplane connectivity and the assignment of traffic demands to those line cards in order to reduce the overall count of line cards within the network. For example, reordering of line card positions may provide a more efficient use of backplane bandwidth and would potentially reduce the number of line cards required to service traffic on the node.

In certain embodiments of the invention, client-side line card optimization is performed so to reduce the number of transport-side line cards required to service a particular number of client-side ports. This client-side line card optimization comprises reordering client-side ports to improve the utilization of transport-line cards.

Other equipment may also be analyzed in an attempt to reduce the overall deployment. For example, cards that don't have ports, but that provide certain functionality within the node such as bandwidth expansion, node management, or power delivery, may be analyzed to identify inefficiencies within a particular deployment configuration.

Embodiments of the invention provide for localized, nodal analysis and reconfigurations, and subsequent monitoring of network effects of these reconfigurations. These system-level effects of nodal reconfigurations are monitored to iteratively identify improvements in deployment efficiencies within an entire network deployment that result from nodal optimization operations.

These various deployment configurations are iteratively analyzed until a preferred deployment configuration is identified. The accuracy of this preferred configuration may be scrutinized relative to a baseline marker that is generated from a subset or portion of the demands used to generate the preferred deployment configuration. The actual set of demands used to generate the baseline marker may be adjusted by an engineer depending on the deployment scenario. The baseline marker is determined by relaxing the constraints placed on all demands. These constraints include backplane restrictions and inter-chassis routing restrictions at a given node. Relaxing the constraints reduces the complexity of the problem greatly allowing a minimum of equipment to be established. This baseline can be scrutinized and compared to the final solution to approximate and evaluate the effectiveness of the final solution Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Embodiments of the present invention provide systems, devices and methods for improving the efficient deployment and configuration of networking equipment within a network build-out. In certain embodiments of the invention, an iterative analysis of inter-node equipment placement and connectivity, and inter- and intra-node traffic flow is performed to identify a preferred deployment solution. This analysis of deployment optimization takes into account both configurations from a network node perspective as well as from a network system perspective. Deployment solutions are iteratively progressed and analyzed to determine a preferred solution based on both the cost of deployment and satisfaction of the network demands. In various embodiments of the invention, a baseline marker is generated from which the accuracy of the solution may be approximated that suggests to an engineer whether the deployment has approached an optimal solution.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of computing and/or network devices. Structures and devices shown below in block diagram are illustrative of exemplary embodiments of the invention and are meant to avoid obscuring the invention. Furthermore, connections between components within the figures are not intended to be limited to direct connections. Rather, connections between these components may be modified, re-formatted or otherwise changed by intermediary components.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
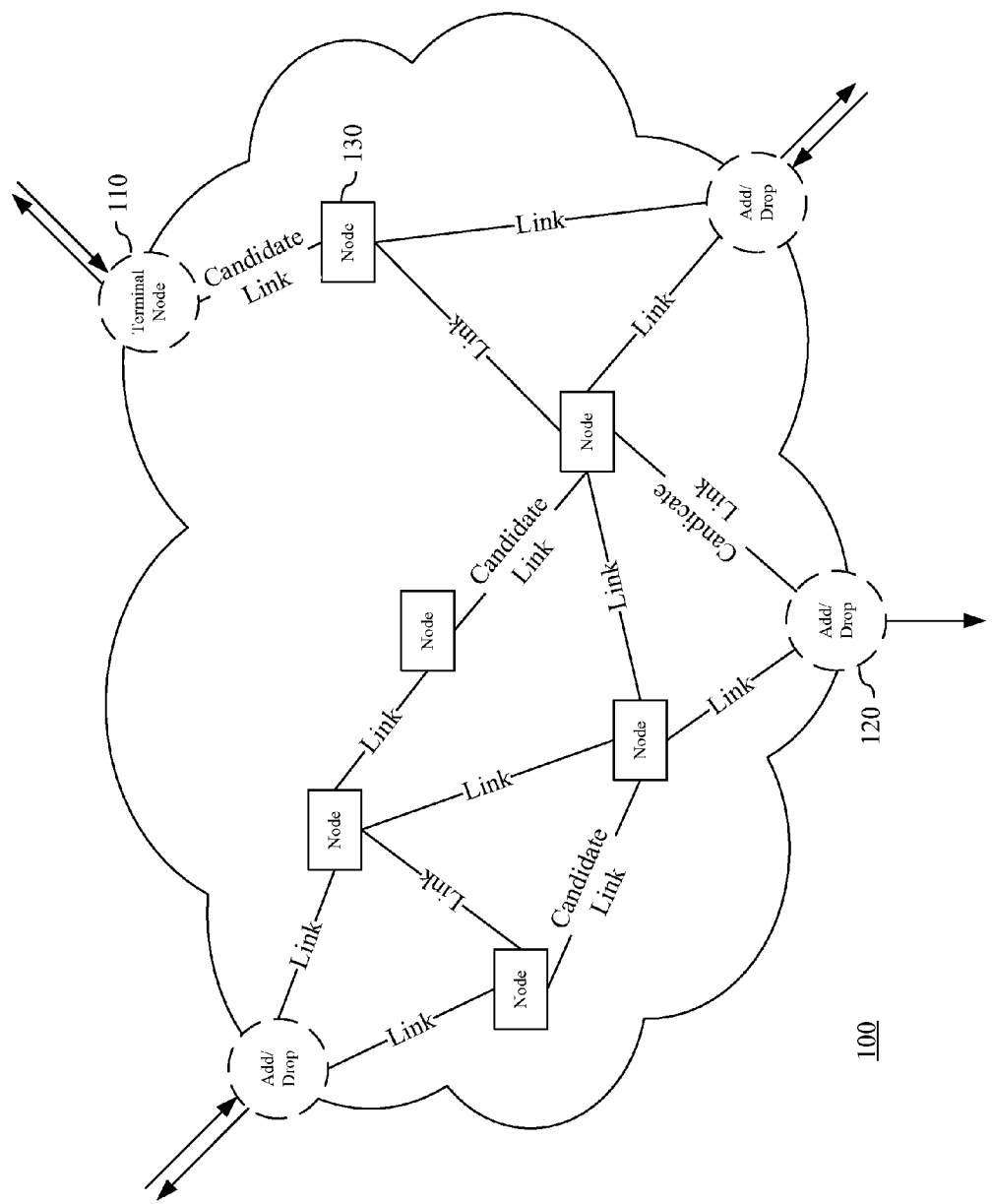
FIG. 1 is a general illustration of a transport network having terminal sites, drop sites and intermediary sites.

FIG. 1 illustrates an exemplary network topology in which an equipment deployment may be proposed. A transport network 100 is shown in which terminal nodes 110 and drop nodes 120 are connected by a plurality of intermediary nodes 130. A terminal node 110 is a node that is able to receive information from a client and transmit this client data on the transport network 100. The terminal node 110 has only one link direction and is also able to receive transport frames, extract client data from these frames, and transmit the client data to a client gateway or device.

Intermediary nodes 130 provide connectivity through the transport network 110 and switch transport frames between relevant nodes. An intermediary node 130 may also include functionality such as signal regeneration, realigning, re-timing, etc. to improve communication through the network 110.

An add/drop node 120 has one or more link directions and contains the same data conversion and mapping functionality within a terminal node. Additionally, an add/drop node 120 may also comprise reconfigurable optical add/drop nodes (hereinafter, "ROADMs") or express-thru nodes that optically switch traffic within the dataplane of the network.

These nodes are connected by links that contain one or more circuits that communicate data between the nodes. Certain of these links may be defined as candidate links, which are discussed in more detail below, for which line card and backplane bandwidth utilization may potentially be improved.

As previously discussed, a network equipment manufacturer may be provided such a network topology, including information about the connectivity and bandwidth, between the network nodes so that a deployment proposal may be generated. This deployment proposal includes a node-by-node site configuration and fiber connectivity plan in which the network is to be constructed. Embodiments of the invention provide a network planning tool that accounts for constraints on each of the nodes as well as constraints on the network at a system level.

Figure 2:
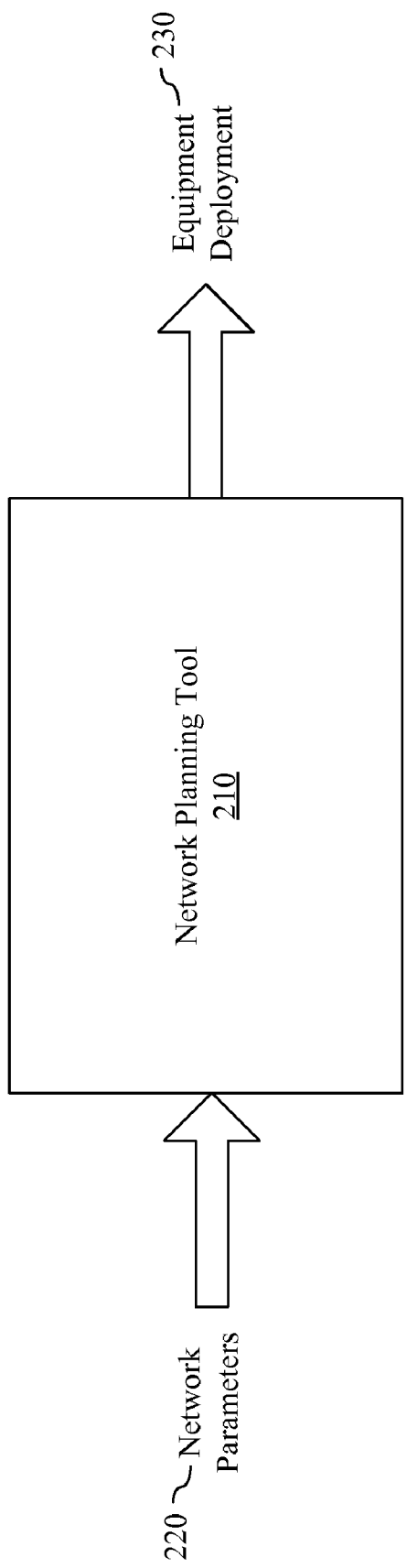
FIG. 2 is a block diagram of a network planning tool in accordance with various embodiments of the invention.

FIG. 2 illustrates a general block diagram of a network planning tool. The network planning tool 210 receives network demands or parameters 220 that describe a network in which an equipment deployment is to occur. As previously discussed, these network parameters 220 may include numerous different network characteristics, network topologies, and nodal characteristics. The network planning tool 210 processes these parameters 220 and generates an equipment deployment and demand routing instructions 230 that satisfies these parameters 220. However, as previously discussed, this deployment may not be optimal and may over-deploy equipment because of its non-optimal design.

The network parameters 220 may comprise the name, type and label of nodes within the network. These parameters 220 may also include link characteristics such and source and destination information, distance, loss, fiber type and maximum number of channels within the link. The parameters 220 may further include network demand sets such as source and destination information, the number of circuits, protection types, diversity options, and service types (e.g., STM/SONET, Ethernet, Fibre Channel, etc.). Network characteristics may also be included within the parameters 220 such as greenfield network design requirements and brownfield network design requirements.

The network parameters 220 may further include equipment characteristics such as equipment properties and costs, release dependencies and availabilities, routing options, equipment configuration options, and optical link design options.

Embodiments of the invention reduce the risk of over-deployment by iteratively analyzing characteristics of multiple deployment configurations at both network node and network system granularities so that a preferred deployment configuration may be accepted. A significant feature of this deployment is the configuration of line cards, both transport-side cards and client-side cards, and physical placement of these cards between and within chassis slots in these different types of sites of the network.

Figure 3:
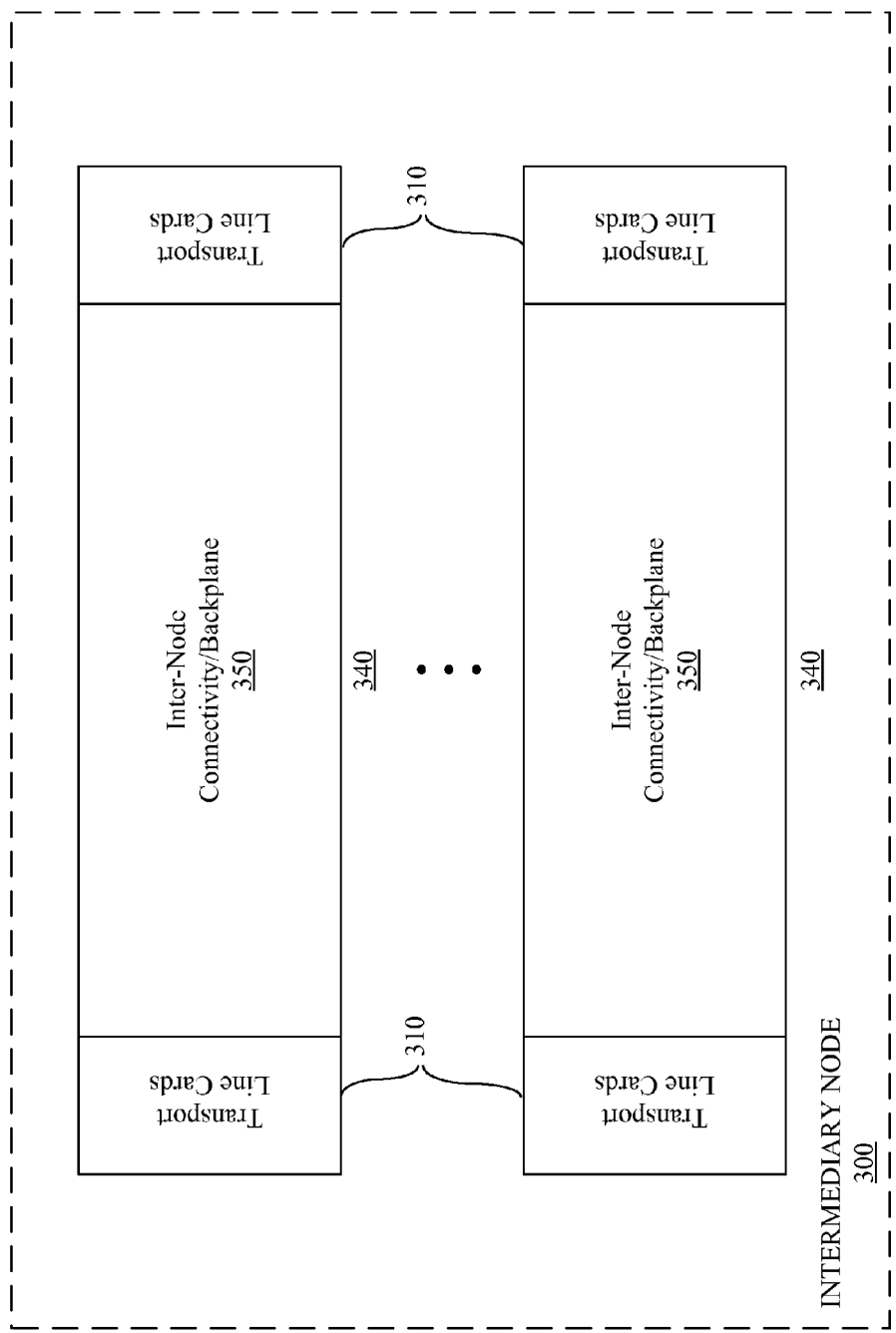
FIG. 3 is a block diagram of an exemplary network site comprising a plurality of line cards.

FIG. 3 illustrates a block diagram of an intermediary node that may be optimized in accordance with various embodiments of the invention. The intermediary node 300 may comprise a single chassis or multiple chasses 340, as shown in this figure, depending on the particular deployment configuration. The intermediary node 300 communicates traffic within the transport network 100 by switching this traffic across a plurality of transport-side line cards deployed within the chassis or chasses 340 in the node. These transport-side line cards 310 may operate in accordance with various protocols (both standards-based and proprietary) and include various types of cards including integrated optic cards such as a Digital Line Module described in U.S. patent application Ser. No. 10/267,212, entitled "Digital Optical Network Architecture." The traffic between these transport-side line cards 310 is communicated within the site via one or more backplanes or inter-node connections 350.

The backplane/inter-node connectivity 350 may comprise one or more of various types of backplanes known in the art including, but not limited to, blocking or non-blocking types having various structural topologies such as ring topologies, full mesh topologies, and partial mesh topologies. This connectivity may also be realized without a backplane by devices such as ROADMs or patch cables coupling ports within the site. Additionally, this connectivity may include a combination of a backplane and other devices such as ROADMs or patch cables.

It is important to note that various other components may be located between a line card and the backplane. These components may provide various functionality including switching, error correction, framing, inter-chassis traffic flow etc.

Figure 4:
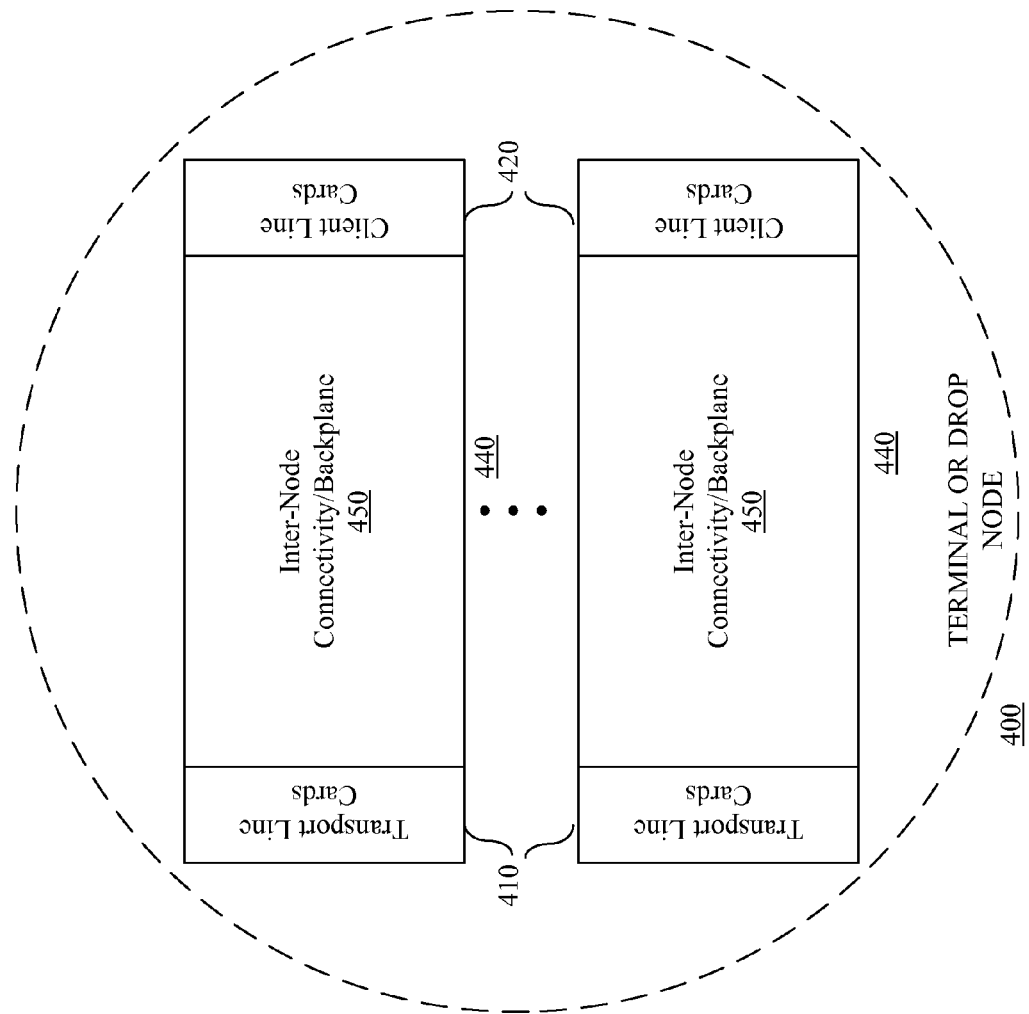
FIG. 4 generally illustrates a terminal or drop site comprising a plurality of line cards in accordance with various embodiments of the invention.

FIG. 4 illustrates a block diagram of a terminal or drop node that may be optimized in accordance with various embodiments of the invention. Similar to an intermediary node, the terminal or drop node 400 may comprise a single chassis or multiple chasses 440 depending on the particular deployment configuration. The terminal and drop nodes 400 communicates traffic between a client network or device and the transport network 100 by switching this client data between a plurality of transport-side line cards 410 and a plurality of client-side line cards 420 deployed within the chassis or chasses 440 in the node. These client-side line cards 420 may operate in accordance with numerous standards and contain various functionality. The client-side line cards 420 and transport-side line cards 410 are connected via inter-node connectivity and/or backplane(s) 450 as previously described in relation to FIG. 3.

One skilled in the art will recognize that network chassis may realize client-side line cards and transport-side line cards using various chassis architectures and line card structures. Furthermore, the chassis and line card architecture may vary across various chasses known by one of skill in the art.

If a terminal node is deployed, then the client-side line cards 420 provide two-way communication between the transport network and the client device. In so doing, the client-side line cards 420 are able to map client data received from the client device into a transport frame so that it may be communicated through the transport network. The client-side line cards 420 are also able to extract client data from a transport frame and map this extracted data into the appropriate frame structure of the client device.

If a drop site is deployed, then the client-side line cards 420 provide two-way communication between the transport network and the client device on which client data is extracted from transport frames and mapped into a client signal.

Although these nodes have been described as having client-side or transport-side line cards, these sites may have other types of cards that are relevant to the deployment of equipment therein. For example, a Tributary Extender Module may be provided within a chassis slot that effectively adds bandwidth to one or more other client-side line cards. In addition, other types of cards may also be relevant to a deployment design such as management cards. Further yet, other components at a site may be relevant to the deployment design such as optical multiplexers that generate optical signal groups that are transported in a network and optical demultiplexers that separate these optical signal groups into individual wavelengths.

Figure 5:
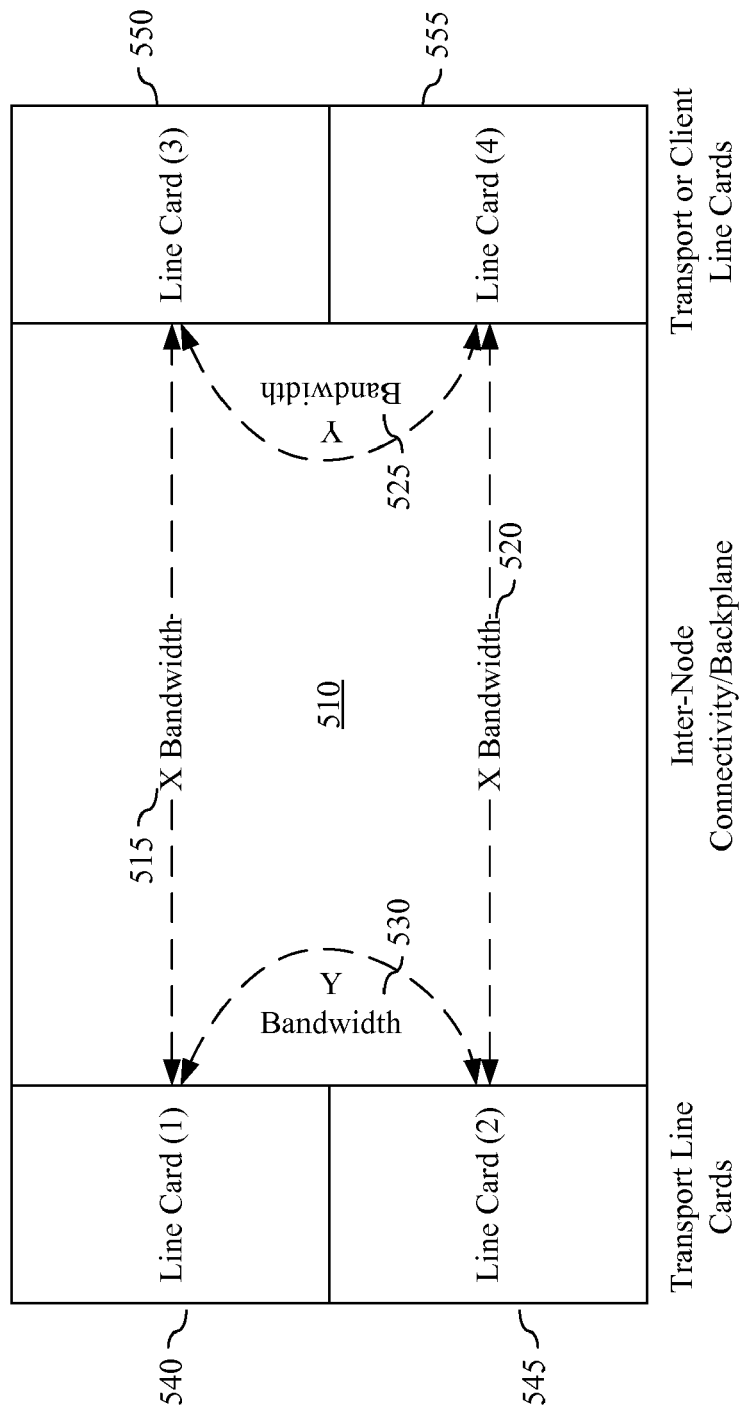
FIG. 5 is a more detailed block diagram illustrating the chassis bandwidth connectivity provided by the backplane in accordance with various embodiments of the invention.

FIG. 5 illustrates an exemplary backplane configuration that may be analyzed during optimization of a deployment design in accordance with various embodiments of the invention. In this particular example, a node is illustrated in which four line cards 540, 545, 550, 555 and coupled via backplane 510. The connections across the backplane may be either bi-directional or uni-directional. This node may be a terminal node, a drop node, an intermediary node or any other node deployed within a network. In FIG. 5, a ring topology is shown which is an example of a partial mesh topology. A full mesh topology may have been defined by directly connecting line card (1) 540 to line card (4) 555 and line card (2) 545 to line card (3) 550.

In this example, the backplane connectivity bandwidth varies depending on the card-to-card path. A first path 515 between line card (1) 540 and line card (3) 550 has X bandwidth. A second path 530 between line card (1) 540 and line card (2) 545 has Y bandwidth. A third path 520 between line card (2) 545 and line card (4) 555 has X bandwidth. A fourth path 525 between line card (3) 550 and line card (4) 555 has Y bandwidth. These differing bandwidth paths through the backplane 510 enable line card placement optimization so that a maximum or near-maximum amount of traffic through the backplane 510 may be realized. If line card placement is done incorrectly, then one path through the backplane 510 may act as a bottleneck while other paths are far below capacity.

In addition, this ring topology does not have point-to-point connectivity between each line card. In this example, there is not a direct connection between line card (2) 545 and line card (3) 550, and between line card (1) 540 and line card (4) 555. If traffic is to be communicated between these cards, then a double-hop path must be used.

This backplane topology enables optimization of line card placement to maximize the efficiency of traffic flow through the backplane 510 and utilization of the line cards. Utilization is defined as representing the amount of bandwidth being used on a line card or backplane connection versus the capacity of the particular line card or backplane connection. One skilled in the art will recognize that other backplane topologies and varying bandwidth paths may be relevant to the optimization of line card placement within a chassis. Furthermore, other types of connectivity such as ROADM connectivity and patch cables may affect optimal positioning of line cards within a chassis.

Figure 6:
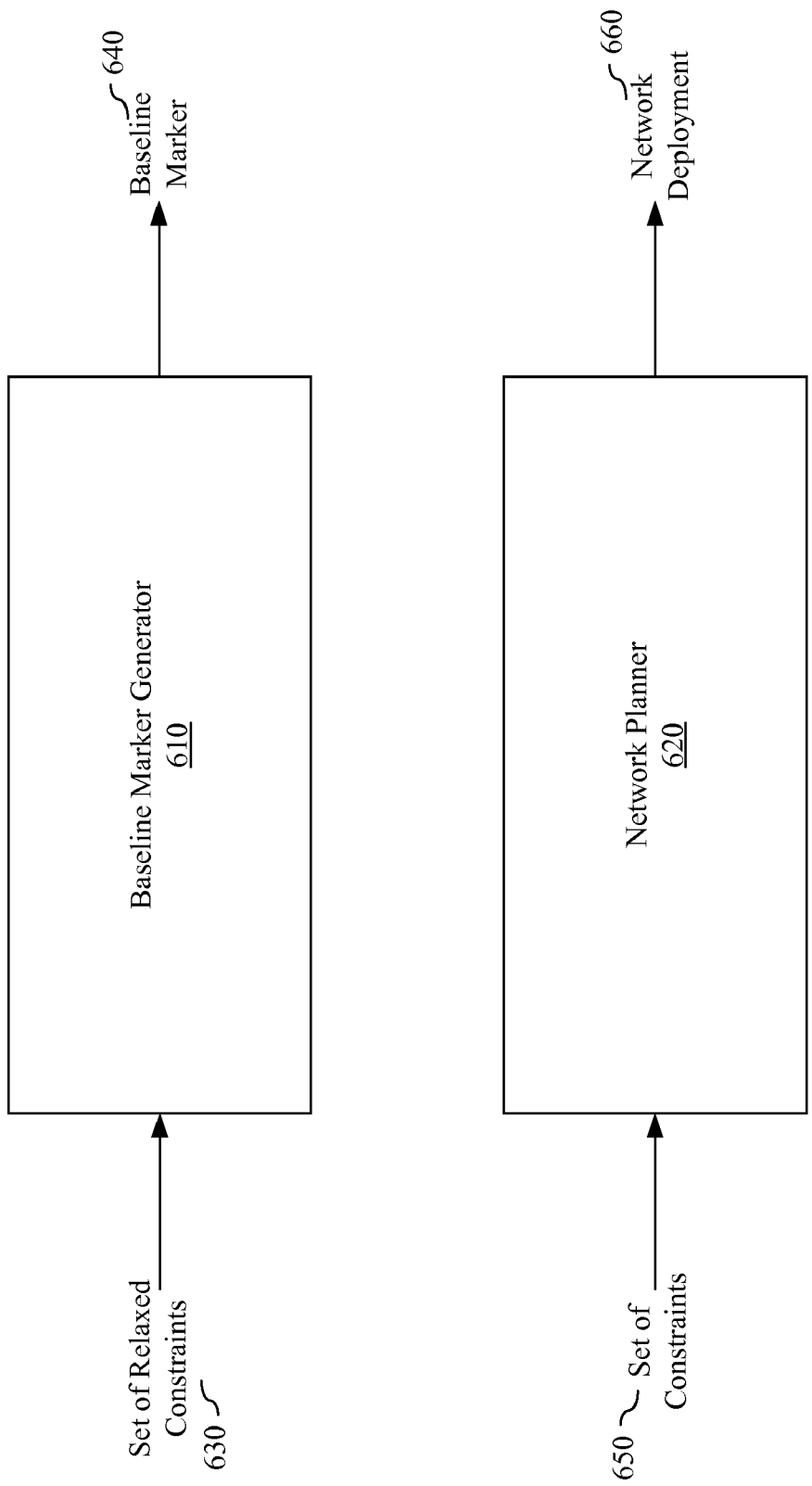
FIG. 6 is a block diagram illustrating a network planning tool and configuration baseline marker generator in accordance with various embodiments of the invention.

FIG. 6 illustrates a block diagram of a baseline marker generator and a network planner in accordance with various embodiments of the invention. A network planner 620 receives a set of constraints 650 and generates a proposed network deployment 660. In certain embodiments of the invention, the network planner iteratively generates multiple proposed network deployments that are analyzed and a most-optimal deployment is selected. The determination of which of these deployments is most-optimal includes a sequence of procedures in which equipment deployments are analyzed at chassis, node and network granularities. In certain embodiments, this most-optimal deployment represents the least number of line cards (including transport-side line cards, client-side line cards, and other cards such as transport expander modules) that satisfies a given topology and demand set where all routes follow an open shortest path first procedure and the network adheres to the nodal constraints therein.

The accuracy of this most-optimal deployment may be compared to a baseline marker to allow a network engineer a metric to judge the quality of the most-optimal deployment. This comparison may generate a differential percentage representing the difference between the most-optimal deployment and a baseline marker 640.

In various embodiments of the invention, a baseline marker generator 610 receives a set of relaxed constraints 630 and generates the baseline marker 640. This set of relaxed constrains 630 is a smaller set of information than that of the set of constraints 650 and requires less processing resources to generate the baseline marker 640. For example, the set of relaxed constraints 630 may be a subset of the set of constraints 650. In other examples, the set of relaxed constraints 630 comprises a portion of the set of constraints 650. In certain embodiments, the set of relaxed constraints 630 may focus more on network demands so that an absolute minimum performance threshold is met if these relaxed constraints are satisfied.

In various embodiments of the invention, the set of constraints 650 includes open shortest path first calculations, protected path diversity, connectivity between a transport-side line card and an optical multiplexer or demultiplexer, bandwidth backplane analysis, full cross-connect chassis constraints (e.g., inter-chassis connection constraints), client-side line card exhaustion, protected end-point diversity, optical-electrical marked unavailable optical channel group (i.e., insufficient bandwidth or bandwidth mismatch on the client-side line cards), port diversity on a chassis, multi-chassis interconnection, maximum line cards available to a chassis. Other constraints may include backplane topology, ROADM connectivity and express-thru connectivity. One skilled in the art will recognize that other network demands may also be included in the set of constraints 650.

In various embodiments of the invention, the set of relaxed constraints 630 is a subset of the set of constraints 650 may include shortest path calculations, protected path diversity and connectivity between transport-side line cards and optical multiplexers/demultiplexers.

The network deployment 660 generated by the network planner 620 includes information about networking equipment, and the location and configuration of this equipment within a network node. For example, this information includes network element characteristics such as chassis type and quantity, circuit pack quantity and type, slots assignments and fiber connectivity. This information may also include network link characteristics such as provisioning links (e.g., supported circuit types and quantities, and capacity utilization) and optical spans (e.g., physical characteristics, link terminating equipment, and photonic or passive attenuation device or dispersion compensation fiber requirements). The network deployment information may include circuit information such as working/protect routes, circuit layout at each node including ingress/egress on optical multiplexer/demultiplexer, ingress/egress on line cards, and transit line card information, and graphical circuit trace information.

Figure 7:
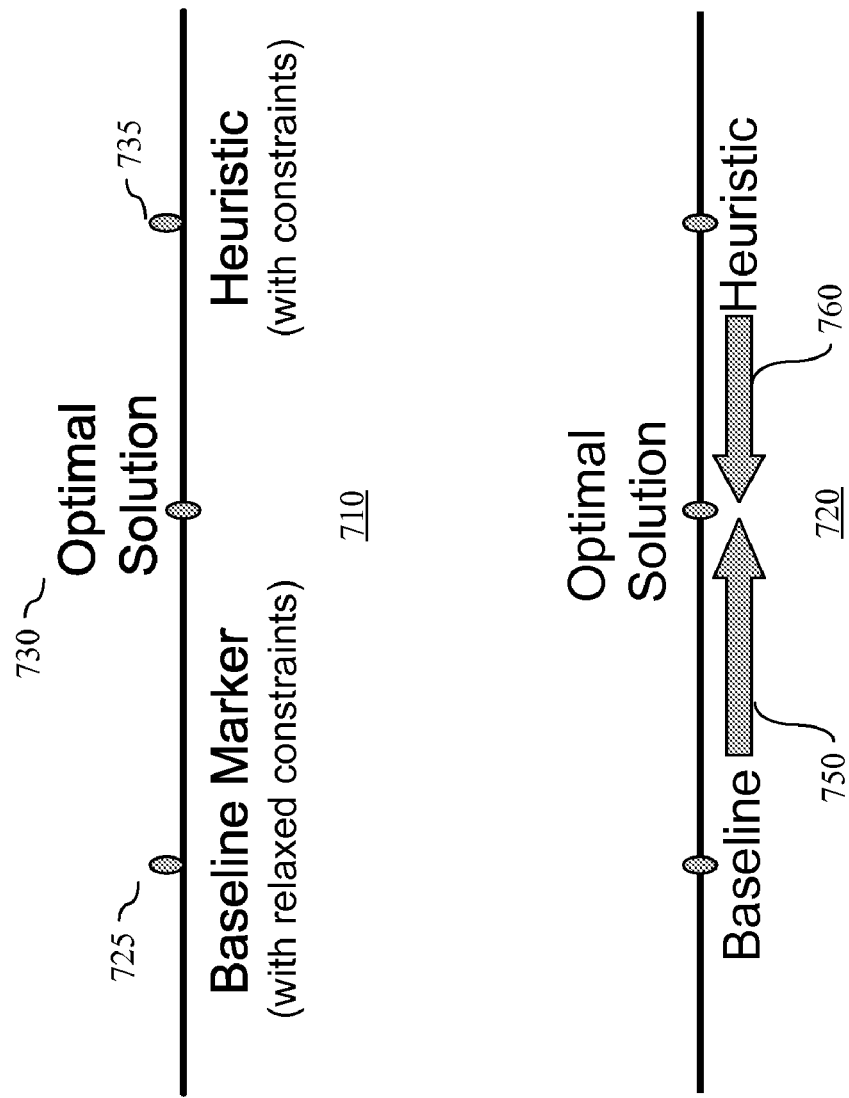
FIG. 7 is an illustration showing a relationship between a baseline marker and a heuristic in accordance with various embodiments of the invention.

FIG. 7 illustrates the relationship between a baseline marker 725 and a network deployment design or heuristic 735, and how this relationship may be used to approach an optimal 730 solution in accordance with various embodiments of the invention. In a first diagram 710, an optimal deployment solution 730 is shown being located between a baseline marker 725, generated from relaxed constraints, and a network deployment design or heuristic 735. An optimal solution 730 may be positioned on or between the baseline marker 725 and the heuristic 735.

The network deployment design or heuristic 735 may be incrementally moved toward the optimal solution 730 by iteratively progressing through different deployment solutions until a preferred solution is achieved. In various embodiments of the invention, this iterative process continues as the total amount of equipment deployed decreases in each of the iterations. Once the total amount of equipment does not decrease relative to previous iterations, then the process ends. As heuristic processes are developed, this baseline marker 725 may be used to gauge the effectiveness of input parameters within these developed processes. In many scenarios, the preferred solution is not the optimal solution 730 but is close to it. The baseline marker 710 may be used as a gauge to analyze the accuracy of the preferred solution relative to the optimal solution 730.

The second diagram 720 shows a method in which a preferred solution may be improved and approach the optimal solution 730. This process includes analyzing different deployments so that multiple baseline markers 725 are generated in an attempt to shift 750 the baseline marker closer to the optimal solution 730. The process also includes analyzing the different deployments to that multiple heuristic values 735 are generated to shift 760 the heuristic value closer to the optimal solution 730.

As the difference between the baseline marker 725 and the heuristic value 735 decreases, a network engineer is able to more effectively progress towards the optimal solution 730. This difference may also be used to gauge the effectiveness of manual preplacement of equipment.

In certain embodiments of the invention, the optimization analysis is performed incrementally node-by-node during which each incremental node analysis looks at deployment configurations within a node and the resulting improvement or degradation of the overall equipment deployment for the entire network. This incremental analysis continues until a trigger ends the iterative analysis and a "most-optimal" deployment configuration is selected.

The transit traffic through the node is analyzed to initially determine the equipment placed within the node. In various embodiments of the invention, this analysis comprises the steps of determining whether a given nodal demand requires a new line card or line card pair to be inserted within the node. A nodal flow is defined as the sum of the bandwidth of all circuits traversing or terminating on a single node organized by the ingress and egress directions represented by the next node of the circuit path which define the direction of the circuits. If a demand's nodal flow is common with a nodal flow already in a chassis (i.e., both nodal flows have the same direction) and the demand's nodal flow exceeds the existing capacity of installed cards, then another line card or line card pair is allocated within the node (this may or may not be in the same chassis for which nodal flow was analyzed). However, if the demand's nodal flow is not common with any of the nodal flows already in the chassis, then a check is performed to determine the demand's related nodal flows and the number of directions required. If the number of directions required exceeds the available slots, then additional line cards are allocated in a different chassis. This step effectively ensures that the transport traffic demand on the node can be properly serviced by the number of transport-side line cards inserted within the node chassis or chasses.

The drop traffic or client traffic at a node is analyzed to also determine equipment placed within the node. In certain embodiments of the invention, this analysis includes checking drop requirements for each demand before allocating a line card or line card pair in the last slot of a chassis. If the drop bandwidth requirements for a nodal flow exceeds the drop capacity of the remaining drop capacity of the other equipped transport-side line cards and the new transports-side line cards, then a transport-side line card is not inserted in the last slot. Instead, additional transport-side line cards may be inserted within another chassis in the node being analyzed. In additional embodiments, this analysis of drop or client traffic may track utilization within client-side line cards and mixed traffic flows through the node. This step effectively ensures that the client traffic demand on the node can be properly serviced by the number of client-side line cards inserted within the node chassis or chasses.

Backplane bandwidth may also be considered in this analysis of equipment placement. As previously discussed, backplane bandwidth may vary across different paths on the backplane. Line card location, relative to these varying backplane bandwidths, may be considered in finding an optimal solution. For example, certain line card location configurations may maximize the efficiency or capacity utilization of the backplane bandwidth. These line card location configurations may be analyzed, within the concept of optimizing line card positioning, to either improve the performance of the node and/or reduce the amount of equipment used within a deployment.

Deployment within the node is iteratively analyzed relative to route selection within the node. In certain embodiments, this analysis is intended to preserve each chassis's degrees of freedom, which is the total number of possible nodal flow routing opportunities remaining within a chassis. For example, if there are two or more line cards/line card pairs on different chassis available during a route selection, then the line card is selected that preserves the highest degree chassis degrees of freedom for servicing traffic in later deployments. This preservation of chassis degrees of freedom provides for more diverse installation options (i.e., different signal directions or signal paths) within a chassis so that there is a greater likelihood that the chassis will be able to service subsequent connections with little or no build-out.

Figure 8:
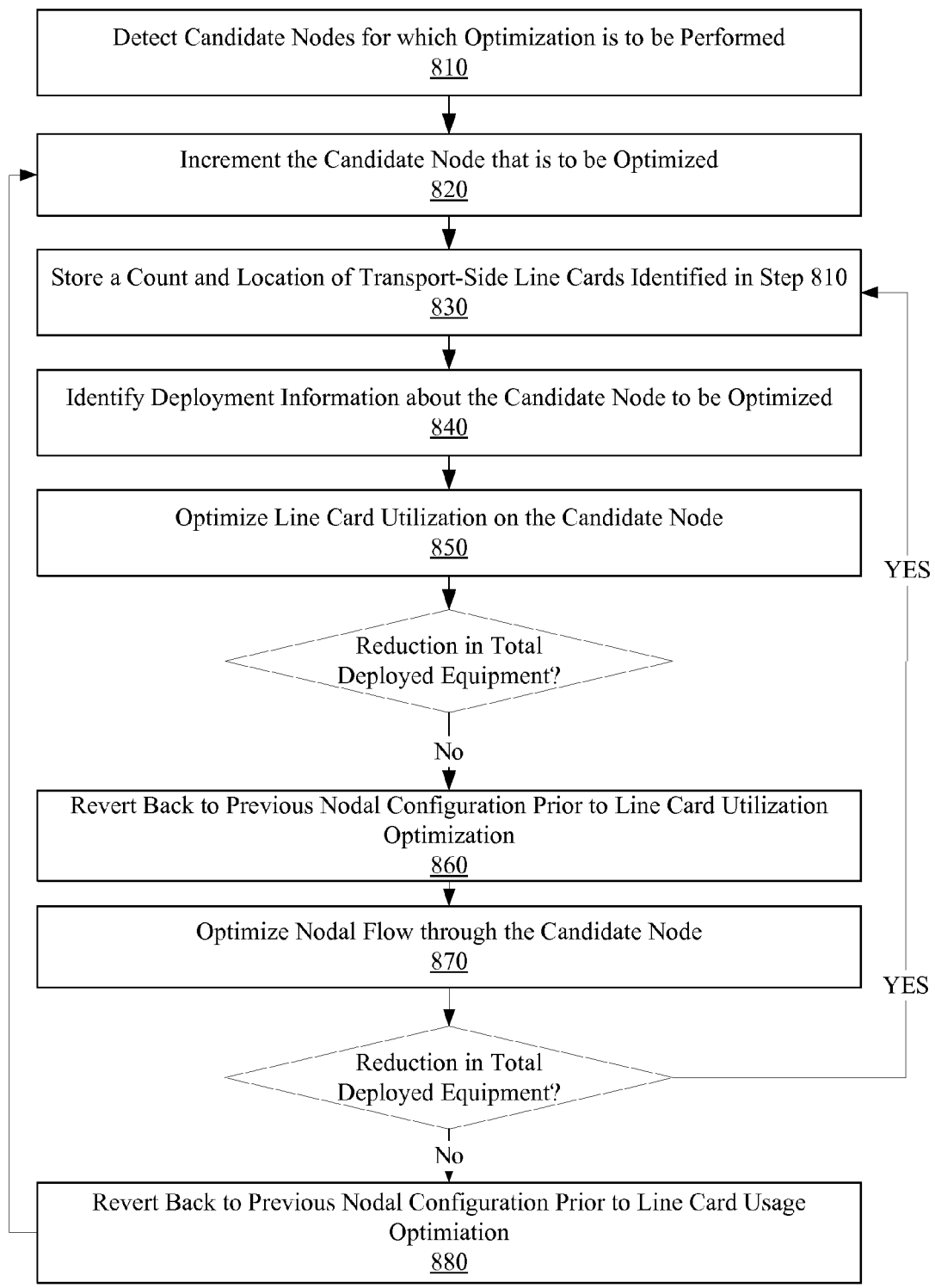
FIG. 8 is a flowchart illustrating a method for intra-nodal optimization in accordance with various embodiments of the invention.

FIG. 8 describes a method within an outer optimization framework according to various embodiments of the invention. Referring to FIG. 8, candidate nodes are detected 810 for which equipment deployment is possibly exceeding an optimal deployment including the equipment to be used, the placement or location of this equipment within the node, and resource consumption. For example, ingress/egress traffic flow is analyzed so that certain candidate nodes are identified on which inefficient line card utilization may be optimized. The candidate node is incremented 820, except the initial node prior to analysis, to progress the analysis through each of the candidate nodes. A count and location is stored 830 of the transport-side line cards for each of the candidate nodes previously identified.

Information about the candidate node be analyzed is stored 840 for use during the analysis. This information may include, but is not limited to, the signals within candidate links on the candidate node, the number of transport-side line cards in the candidate node, the nodal flows through the candidate node, and the circuits on the candidate node.

The line card utilization 850 on the node is analyzed to determine whether a more efficient configuration of line cards can reduce the number of cards that service the nodal traffic. One example of this analysis of line card utilization is described in FIG. 9.

A network system analysis is performed to determine whether a total reduction in deployed equipment resulted from nodal analysis of line card utilization. If such a total reduction occurred, then the optimization is marked as an improvement and the method loops to step 830 for further iterative optimization of the equipment deployment. If there was not a total reduction, then the nodal configuration is reverted 860 to its previous configuration.

The nodal flow through the candidate node is analyzed 870 to determine whether a more efficient nodal flow configuration reduces the amount of equipment deployed. One example of this nodal flow optimization is described in FIG. 10.

Once again, a network system analysis is performed to determine whether a total reduction in deployed equipment resulted from nodal analysis of nodal flow utilization. If such a total reduction occurred, then the optimization is marked as an improvement and the method loops to step 830 for further iterative optimization of the equipment deployment. If there was not a total reduction, then the nodal configuration is reverted 880 to its previous configuration. The processes loops back to step 820 to increment to the next candidate node for optimization analysis until all of the candidate nodes have been analyzed.

In certain embodiments of the invention, after all of the detected candidate links have been analyzed and a preferred deployment identified, the process restarts in which candidate nodes are identified within the preferred deployment. This iterative process continues until an identified preferred deployment on any of the nodes fails to provide an equipment reduction from the previous preferred deployment.

In various embodiments of the post-processing heuristics, the outer optimization framework is provided such that all sites, candidate links are detected and each candidate link identifies a site and link in the direction of a node pair within the transport network. For each candidate link, a count and location is stored for all of the transport-side line cards and circuits within the transport network. Various characteristics of each candidate link is identified including, but not limited to, the optical channel groups transmitted over the candidate link, the transport-side line cards connected to the candidate link, nodal flows over the candidate link, and circuits over the candidate link.

As mentioned above, the post-processing heuristics optimize equipment deployment using various methods of optimization including an analysis of line card utilization. These post-processing heuristics are analyzed first at the node, a reconfiguration of equipment within the node occurs, and then a subsequent determination is performed to see if an overall reduction in the deployed equipment in the network results. For example, post-processing heuristics may reduce the total number of line cards within a single node by two, but result in greater than two additional line cards being inserted at other node within a network. Such a result would not improve the network deployment and would be discarded. However, if the reduction of two line cards at the node being analyzed results in zero or one additional card be required on any other node in the network, then the overall equipment count in the deployment has been reduced and this change would be identified as an improvement to the equipment deployment.

Figure 9:
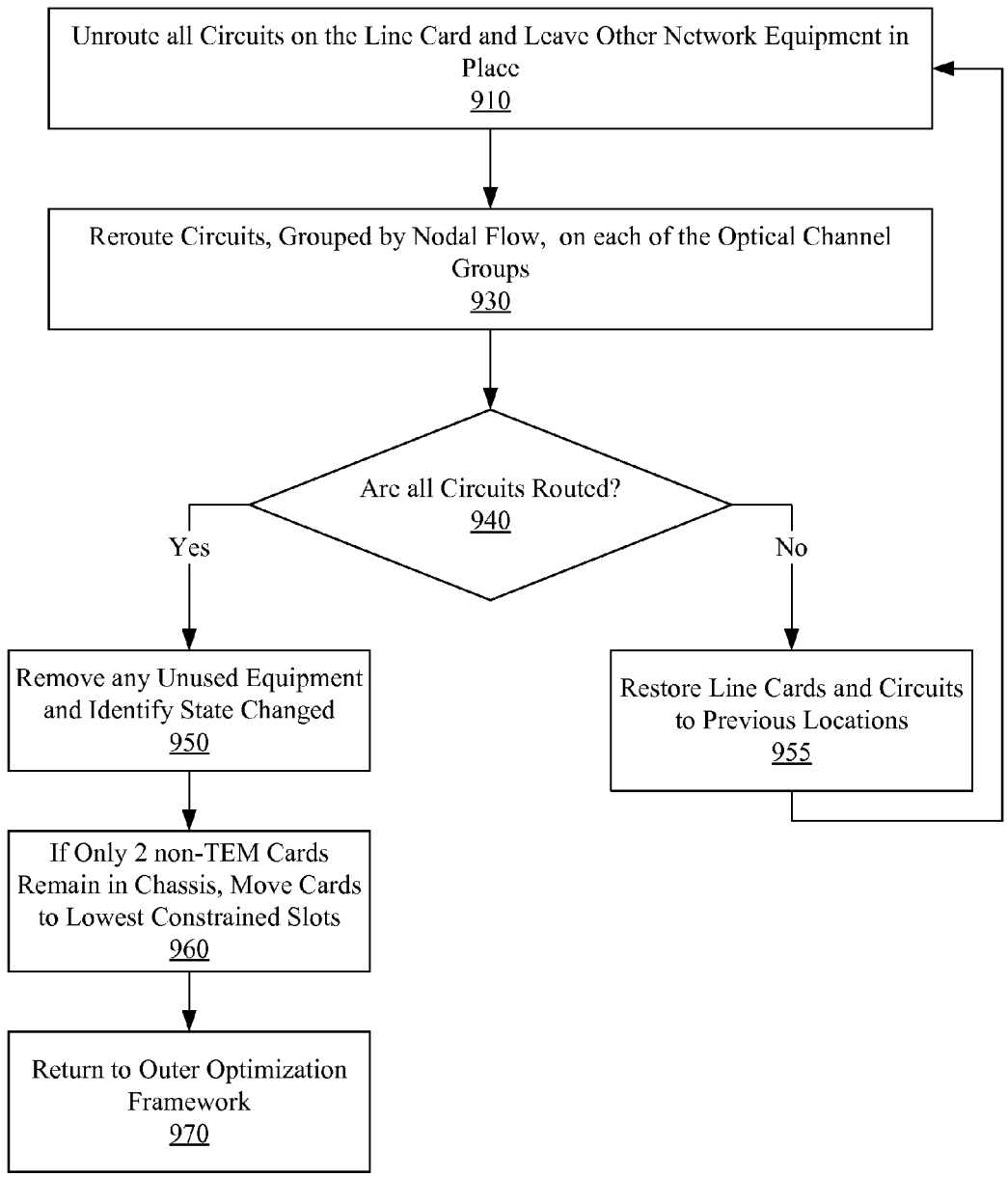
FIG. 9 is a flowchart illustrating a method for optimizing bandwidth utilization of line cards in accordance with various embodiments of the invention.

FIG. 9 is a flowchart illustrating a method for analyzing utilization of line cards so that deployed equipment may be reduced according to various embodiments of the invention. In this method, a plurality of circuit paths is unrouted 910 on a candidate link while other network equipment is left in place. A circuit path is defined as the route through the network from the source node to the destination node identifying at least some of the intermediate nodes between the source and destination nodes. Typically, this plurality of circuit paths is all of the circuit paths on a particular line card.

Circuits are rerouted 930 back onto the candidate link and grouped by nodal flow on each of the optical channel groups received by the chassis or chasses in the node. As previously described, nodal flow is defined as the sum of the bandwidth of all circuits traversing or terminating on a single node organized by the ingress and egress directions represented by the next node of the circuit path. A determination is done as to whether all the circuits were able to be routed 940 back onto the candidate link using the new rerouted configuration. This rerouting of circuit is done iteratively so that multiple configurations are progressed through and analyzed in relation to their reduction of equipment in the network. If all of the circuits were routed, then any unused equipment is removed 950 and a state change is identified. As previously described, the state of the network comprises the location and placement of line cards within a particular deployment configuration.

If only two non-tributary expander module cards remain in the chassis, then these cards are placed 960 into slots within the chassis that offer the least amount of backplane constraints for future demands transiting the chassis. Examples of such non-tributary expander module cards include a line card that adds or drops client traffic to/from the network. Thereafter, the process returns to the outer optimization framework 970.

If all of the circuits were not able to be routed, then line cards and circuits are restored 955 to previous locations. Thereafter, the process is restarted and the circuits are unrouted and re-routed again to try and find an improved circuit configuration on the particular link candidate.

Figure 10:
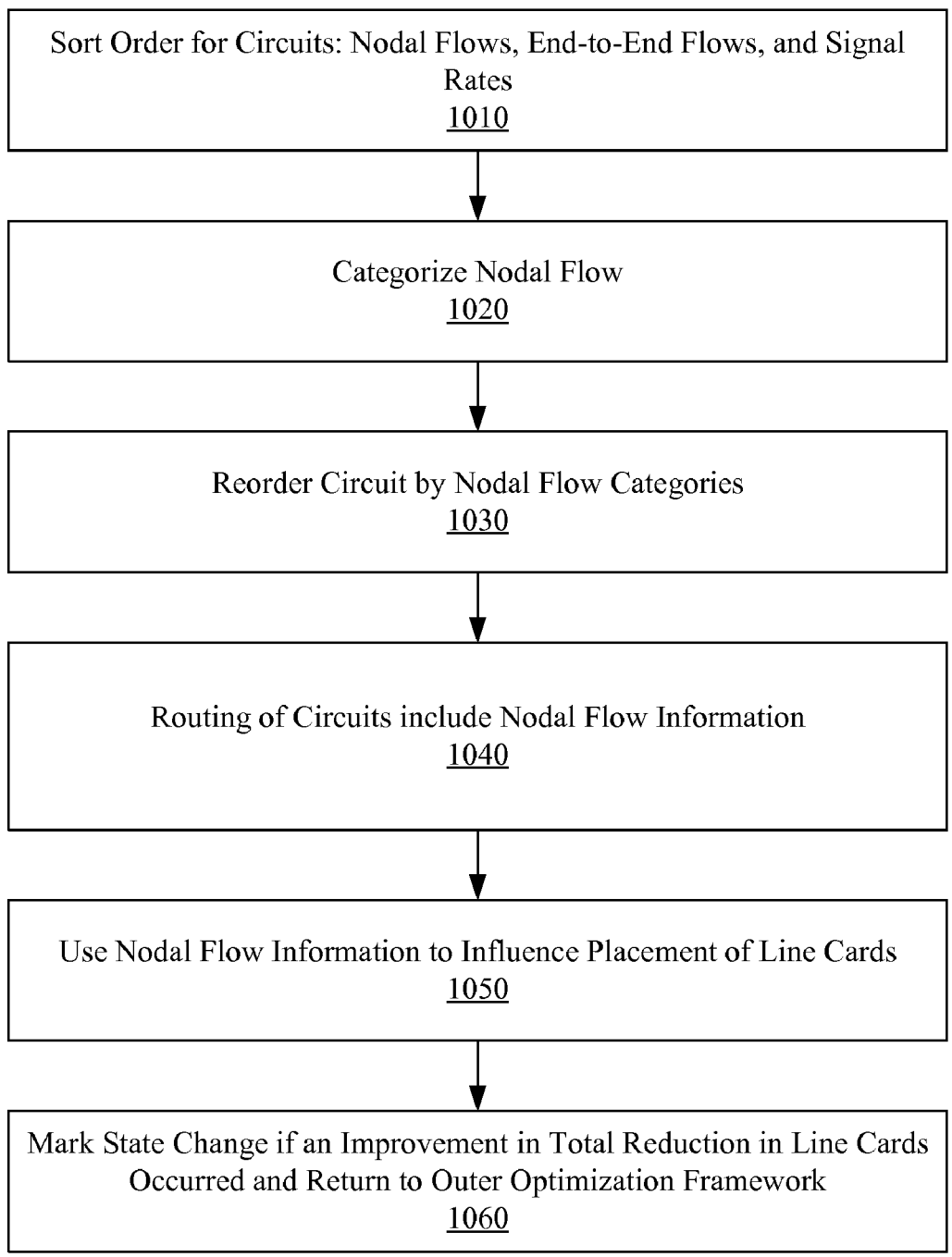
FIG. 10 is a flowchart illustrating a method for reordering of nodal flows for line card packing at a network site in accordance with various embodiments of the invention.

FIG. 10 illustrates a method for reordering of nodal flows to optimize deployment and configuration of equipment according to various embodiments of the invention. For a particular candidate link, all circuits are unrouted and all equipment is removed that was affected by these unrouted circuits within the various network nodes.

The unrouted circuits are ordered 1010 according to nodal flows, end-to-end flows, and rates. For example, circuits of 100 G, 40 G, 10 G and 2.5 G may be grouped and ordered accordingly. If a nodal flow is greater than 100 G, then the flow is split into 100 G groups of nodal flows and a single remainder nodal flow. This grouping allows for an attempt to more efficiently map nodal flows to line card and backplane bandwidth constraints on the affected nodes.

The nodal flows are categorized 1020. In certain embodiments of the invention, nodal flows are categorized into three types: (1) 100 G transit nodal flows for those transiting this node with a nodal flow size of 100 G, (2) all other transiting nodal flows, such as partial nodal flows, (3) and add/drop flows. One skilled in the art will recognize that numerous categorization schemes may be used to categorize these nodal flows. For example, if a line card has a bandwidth capacity of 40 G, then the nodal flow size may be incremented in 40 G, 10 G, and 2.5 G increments.

The circuits are reordered 1030 by nodal flow categories and connected to corresponding line cards to improve line card and bandwidth connectivity capacity utilization. For purposes of clarity, this reordering is described in relation to FIG. 5 in which four line cards are shown with corresponding backplane connectivity. In certain embodiments of the invention, the circuits are reordered according to the following:

(a) pairs of 100 G nodal flows with four different network directions (e.g., a North, South, West, and East direction), such as those with no common direction among the two pairs, (i.e., the nodal flow traverses line cards (1), (2), (3), (4) where each line card has a different direction) are grouped and routed;

(b) pairs of 100 G nodal flows with three different directions, in which certain nodal flows have one common direction (e.g., nodal flows are routed from line card (1) to line card (3), and from line card (2) to line card (3)) are grouped and routed;

(c) remaining pairs of 100 G nodal flows are grouped and routed;

(d) use exhaustive search criteria for partial nodal flows is performed so that larger nodal group may be created by identifying and grouping partial nodal flows having the same direction. These newly created larger nodal flows are re-routed across an appropriate chassis.

In certain embodiments of the invention, these grouping are evaluated so that flows are selected and prioritized according to these criteria. First, the groupings are analyzed to identify if there is a set of flows such that the largest number of flows fit within a chassis. For example, if the chassis in FIG. 5 is analyzed, then a maximum of six nodal flows may be communicated across the backplane.

Second, the groupings are analyzed to try and find nodal flow configurations that require the smallest number of line cards in the chassis. Next, priority is given to nodal flow or flows that are in the direction of a problematic or particular nodal flow direction. For example, an inefficiently routed nodal flow may be given priority in a reconfiguration of flows through a chassis. Another factor in prioritizing the nodal flow grouping is giving nodal flows that satisfy the largest bandwidth across a backplane higher priority. One skilled in the art will recognize that other factors may be used to prioritize and reconfigure nodal flow through a chassis backplane. Thereafter, the add/drop flows are inserted to best align with the backplane bandwidth and client-side line card locations.

This routing of circuits is performed to include and relate with the nodal flow information 1040. In various embodiments of the invention, this nodal flow information includes the size of the circuit, the size of the nodal flow and the remaining bandwidth in flow yet to be routed. This nodal flow information is also used to influence 1050 placement of the line cards. In certain embodiments of the invention, if the remaining bandwidth for the circuit's nodal flow does not fit within the available nodal flow bandwidth, then new equipment is deployed for this circuit. Thereafter, a state change is marked if an overall decrease in deployed equipment is realized and is returned 1060 to the outer optimization framework.

This reordering of nodal flows potentially reduces the number of deployed line cards by attempting to more efficiently match the location of line cards within the chassis to the backplane bandwidth and connectivity characteristics thereof.

Figure 11A:
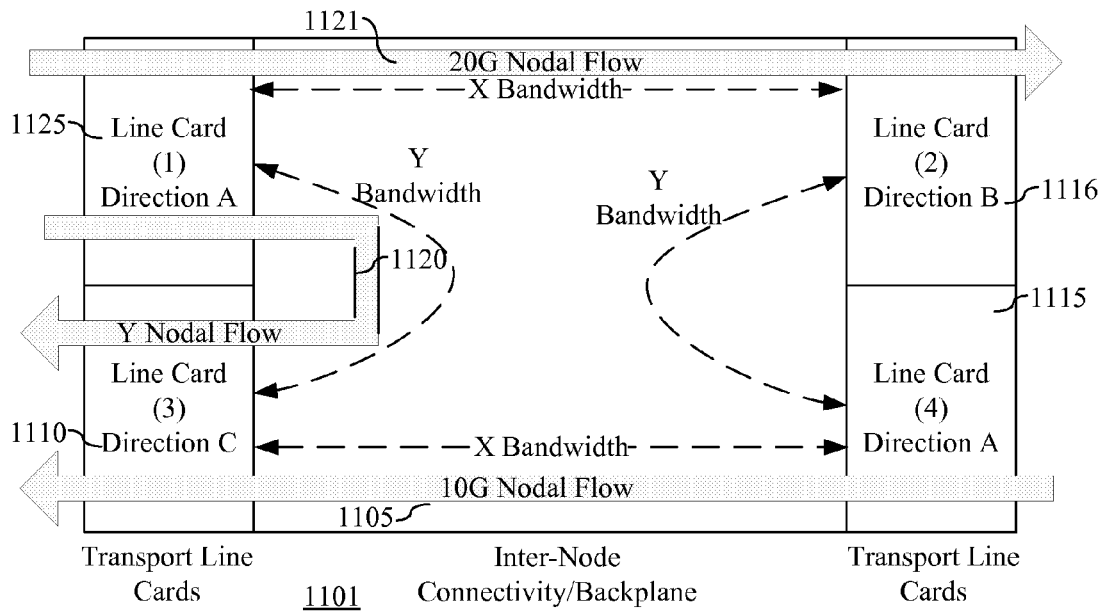
FIG. 11A is an illustration showing improvement of line card utilization in accordance with various embodiments of the invention.
Figure 11A:
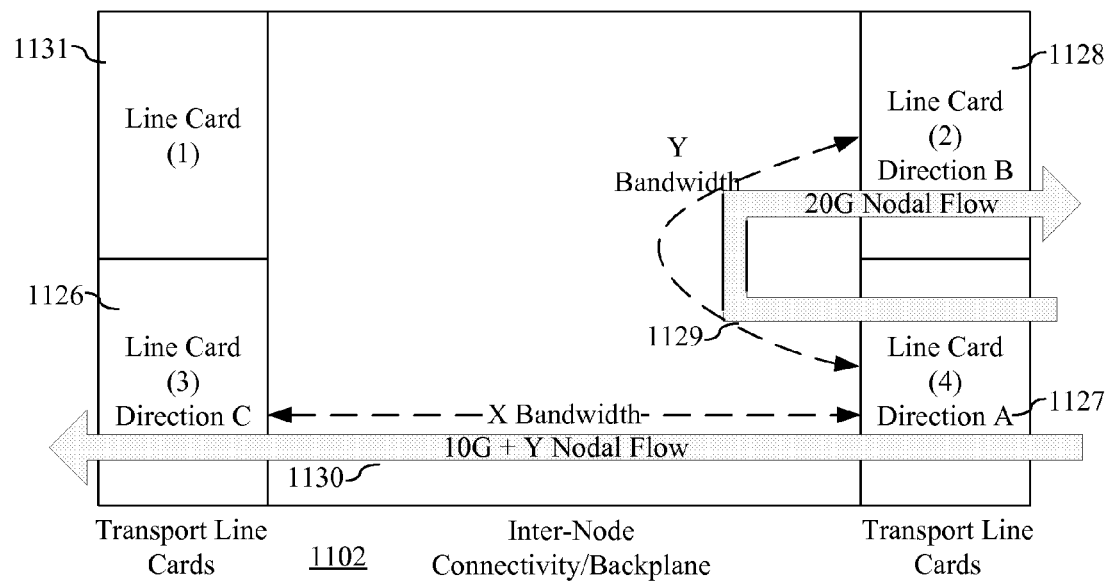

FIG. 11A illustrates an exemplary multi-chassis deployment in which fractional utilization across multiple cards is optimized. A first chassis 1101 is shown in which nodal flow through the chassis backplane is not optimized. In this example, nodal flow of 20 G is communicated from direction A to direction B. Nodal flow of Y+10 G is communicated from direction A to direction C. As previously illustrated in FIG. 5, the backplane has different connectivity bandwidths between line cards.

In the unoptimized scenario, a 20 G nodal flow 1121 is routed between a first line card 1125 having a direction A and a second line card 1116 having a direction B. A Y nodal flow 1120 is routed between the first line card line 1125 and a third line card 1110. This Y nodal flow 1120 utilized the full connectivity bandwidth on the backplane. A 10 G nodal flow is routed between a fourth line card 1115 having a direction A and the third line card 1110 having a direction C.

This fractional utilization of line cards is optimized by identifying a more configuration of the cards in accordance with various embodiments of the invention. An optimized second chassis 1102 is shown in which the number of cards servicing nodal flow is reduced. In this example, the 20 G nodal flow 1129 is communicated between a fourth line card 1127 having a direction of A and a second line card 1128 having a direction of B. A nodal flow of 10 G+Y 1130 is communicated between the fourth line card 1127 and a third line card 1126 having a direction of C.

This optimized configuration reduces the number of cards used to service the two nodal flows of 20 G from direction A to B, and 10 G+Y from direction A to C. In particular, the first line card 1131 is no longer needed within the second chassis 1102.

Figure 11B:
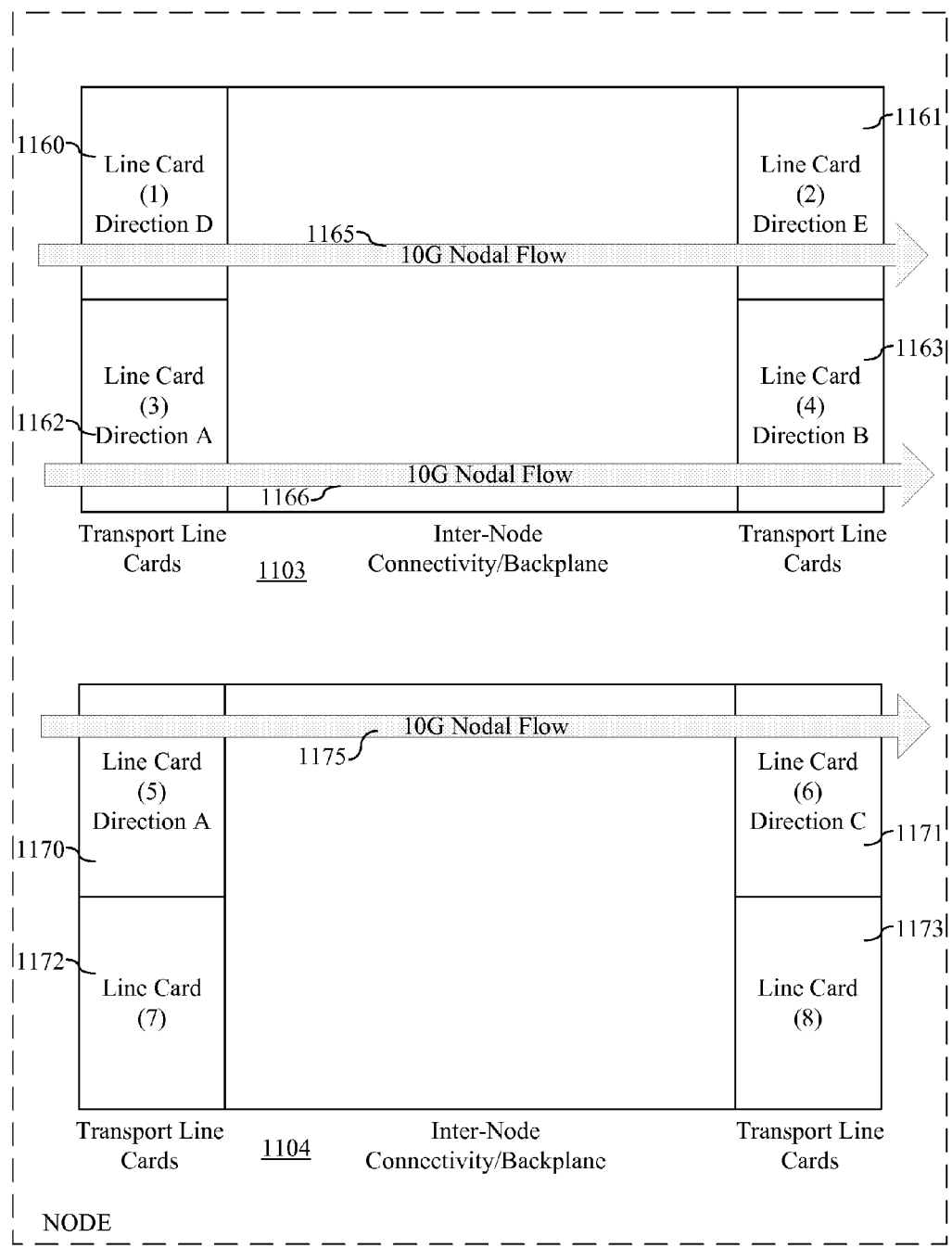
FIGS. 11B and 11C are illustrations showing improvement of nodal flow within a multi-chassis node in accordance with various embodiments of the invention.
Figure 11C:
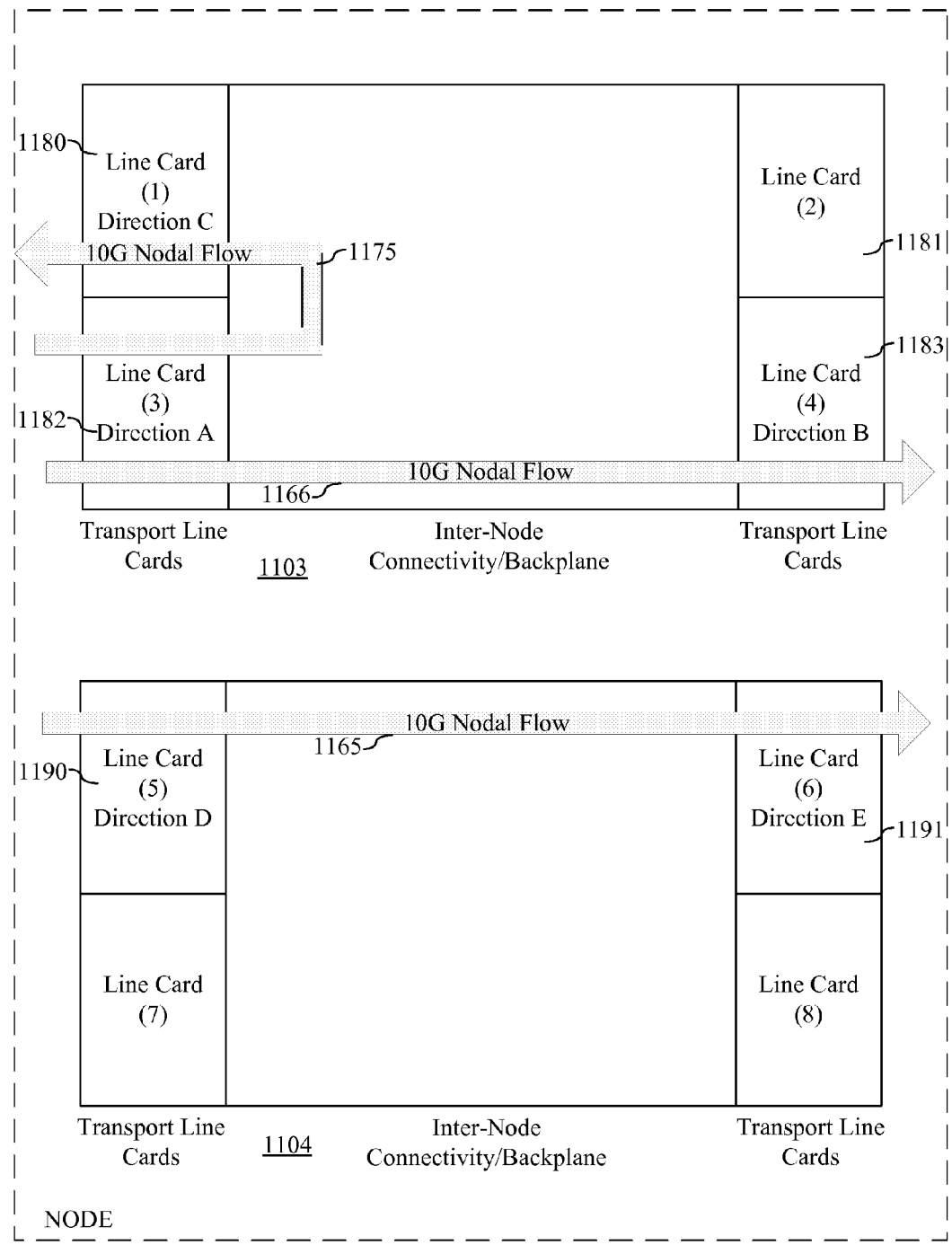

FIGS. 11B and 11C illustrate examples of nodal flow reorganization according to various embodiments of the invention. FIG. 11B shows an unoptimized multi-chassis deployment. In this example, there are three 10 G nodal flows through the node. In this initial configuration, a first 10 G nodal flow 1165 is between a first line card 1160 having a direction of D and a second line card 1161 having a direction E, both cards in a first chassis 1103. A second 10G nodal flow 1166 is between a third line card 1162 having a direction of A and a fourth line card 1163 having a direction B, both cards also being in the first chassis 1103.

A second chassis 1104 contains a third 10G nodal flow 1175 between a fifth line card 1170 having a direction of A and a second line card 1171 having a direction C. Embodiments of the invention identify nodal flow reorganization to try and optimize this nodal flow and reduce the number of line cards required to service them.

FIG. 11C organizes the nodal flows to reduce the number of cards to service four nodal flows using three line cards. In this example, the first chassis 1103 is reordered with the second nodal flow 1166 being communicated between a third line card 1182 having a direction A and a fourth line card 1183 having a direction B. The third nodal flow 1175 is also reordered within the first chassis between the third line card 1182 and a first line card 1180 having a direction C.

The first nodal flow 1165 is communicated across the reordered second chassis 1104 between a fifth line card 1190 having a direction D and a sixth line card 1191 having a direction E. The result of this circuit unrouting, nodal flow grouping, and nodal flow re-routing has reduced the number of line cards within the node because the second line card 1181 in the first chassis 1103 is not servicing any circuits and may be removed. Although other cards shown within the second chassis 1104 have not been described, one skilled in the art will recognize that if traffic resides on these cards, then this traffic would be subject to the optimization method described above.

In a further embodiment of the invention, the eight line cards on the two chassis could have been removed and optimally configured to service the unrouted circuits. Such a removal and replacement of line cards may further optimize the nodal flow efficiency of the node and allow further reduction of equipment. Additionally, embodiments of this method may be applied to the optimization of add/drop nodes, termination nodes and other junction nodes in which nodal flows are more efficiently aligned to bandwidth between client-side line cards and transport-side line cards.

Figure 12:
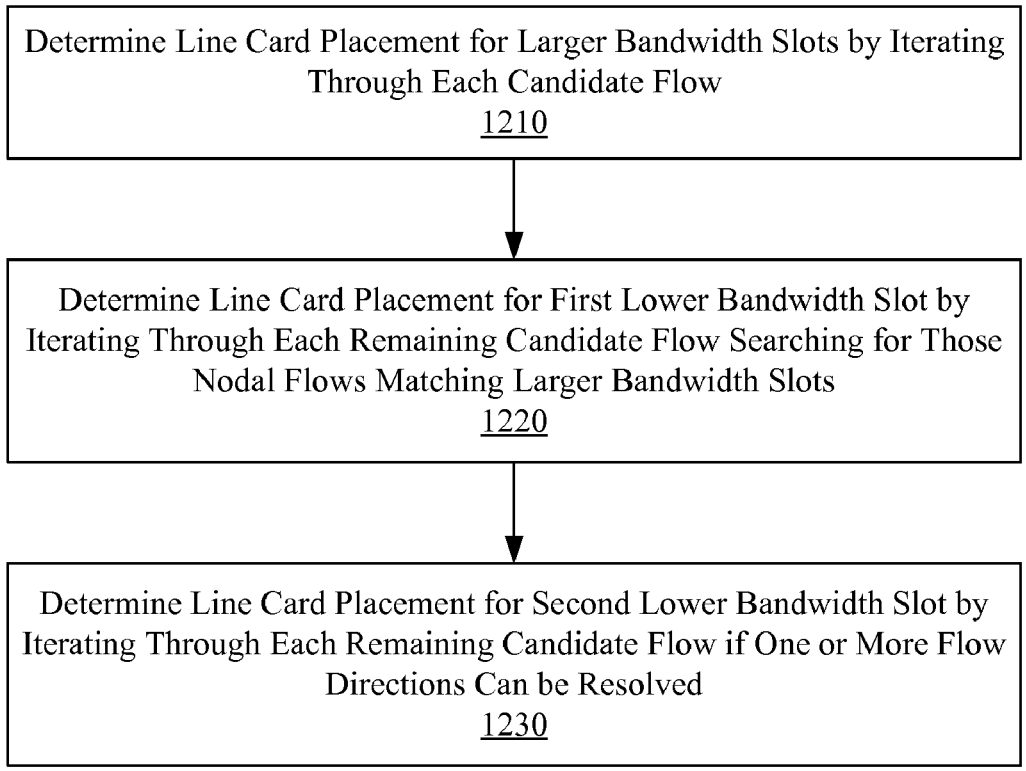
FIG. 12 is a flowchart illustrating a method for circuit ordering based on nodal flow search according to various embodiments of the invention.

FIG. 12 illustrates a flowchart for a method of circuit ordering based on exhaustive nodal flow search in order to reduce the number of chassis according to various embodiments of the invention. In particular, this method exhaustively searches through the remaining nodal flows to find an order that will pack the largest number of nodal flows into the next chassis and then iterate for subsequent chasses.

Line card placement is determined 1210 for larger bandwidth slots by iterating through each candidate flow. Thereafter, line card placement is determined 1220 for a first lower bandwidth slot by iterating through each remaining candidate flow searching for those nodal flows matching larger bandwidth slots. Line card placement is further determined 1230 for a second lower bandwidth slot by iterating through each remaining candidate flow if one or more flow directions can be resolved.

This circuit ordering provides an improved line card placement within the chassis and matches the placement of the line cards to the bandwidth of paths through the chassis backplane.

The foregoing description of the invention has been described for purposes of clarity and understanding. It is not intended to limit the invention to the precise form disclosed. Various modifications may be possible within the scope and equivalence of the appended claims.

We claim:

1. A method for optimizing a network node having a plurality of transport-side line cards and a backplane, the method comprising:
    identifying a first group of transport-side line cards that connect a plurality of traffic circuits through the network node; and
    identifying a second group of transport-side line cards that connect said plurality of traffic circuits through the network node, said identifying the second plurality of transport-side line cards including ordering nodal flows across the backplane, said identifying the second plurality of transport-side line cards being based on one or more of a set of constraints selected from a group consisting of shortest path calculations associated with the plurality of traffic circuits, protected path diversity associated with the plurality of traffic circuits, connectivity between each of the first group of transport-side line cards, topology of the backplane, and routing restrictions within a chassis,
    wherein a number of the first plurality of transport-side line cards is larger than a number of the second plurality of transport-side line cards.

2. The method of claim 1 wherein ordering nodal flows includes the steps of:
    unrouting the plurality of traffic circuits from the first group of transport-side line cards;
    categorizing the unrouted traffic circuits into a plurality of nodal flows to form a plurality of categorized nodal flows; and
    routing the plurality of categorized nodal flows through the network node.

3. The method of claim 2 wherein the plurality of categorized nodal flows are categorized according to flow rates.

4. The method of claim 2 further comprising the step of using nodal flow information to route the plurality of categorized nodal flows through the network node to preserve a highest number of chassis degrees of freedom for future demands.

5. The method of claim 2 further comprising the step of grouping a first plurality of categorized node flows, all having a same direction through the network node, and routing the first plurality of categorized node flows in the network node.

6. The method of claim 1 further comprising the step of determining whether identifying the second group of transport-side line cards resulted in a reduction of transport-side line cards used to satisfy network demands in a network.

7. The method of claim 6 wherein identifying the second group of transport-side line cards defines one of a plurality of network node configurations, the method further comprising the step of iteratively progressing through the plurality of network node configurations to select a preferred one of the plurality of node configurations based on a total cost of equipment deployed within a network.

8. The method of claim 1 wherein the backplane includes a topology selected from a group consisting of a full mesh topology and a partial mesh topology.

9. The method of claim 8 wherein the partial mesh topology is a ring topology.

* * * * *